United States Patent [19]

Still

[11] 4,026,517

[45] May 31, 1977

[54] BIASABLE SEAL FOR GATE VALVES

[75] Inventor: Robert C. Still, Tucson, Ariz.

[73] Assignee: New Concepts, Inc., Tucson, Ariz.

[22] Filed: Mar. 17, 1976

[21] Appl. No.: 667,599

[52] U.S. Cl. .................... 251/214; 251/231; 251/328; 251/329

[51] Int. Cl.² .................. F16K 27/04; F16K 3/02

[58] Field of Search .......... 251/328, 326, 214, 231

[56] References Cited

UNITED STATES PATENTS

| 964,838 | 7/1910 | Badger | 251/328 X |
|---|---|---|---|
| 1,754,198 | 4/1930 | Du Bois | 251/328 X |
| 2,842,283 | 7/1958 | Smith | 251/326 X |
| 2,873,943 | 2/1959 | Williams | 251/328 X |
| 2,942,841 | 6/1960 | Stillwagon | 251/326 X |
| 3,033,517 | 5/1962 | Rovang et al. | 251/328 X |

Primary Examiner—Arnold Rosenthal
Attorney, Agent, or Firm—Cahill, Sutton & Thomas

[57] ABSTRACT

A selectively biased seal for a gate, which gate is translatable within a one piece liner of a gate valve, is disclosed. Lever means for operating the gate and oriented with or normal to the direction of flow through the gate valve are also described.

12 Claims, 5 Drawing Figures

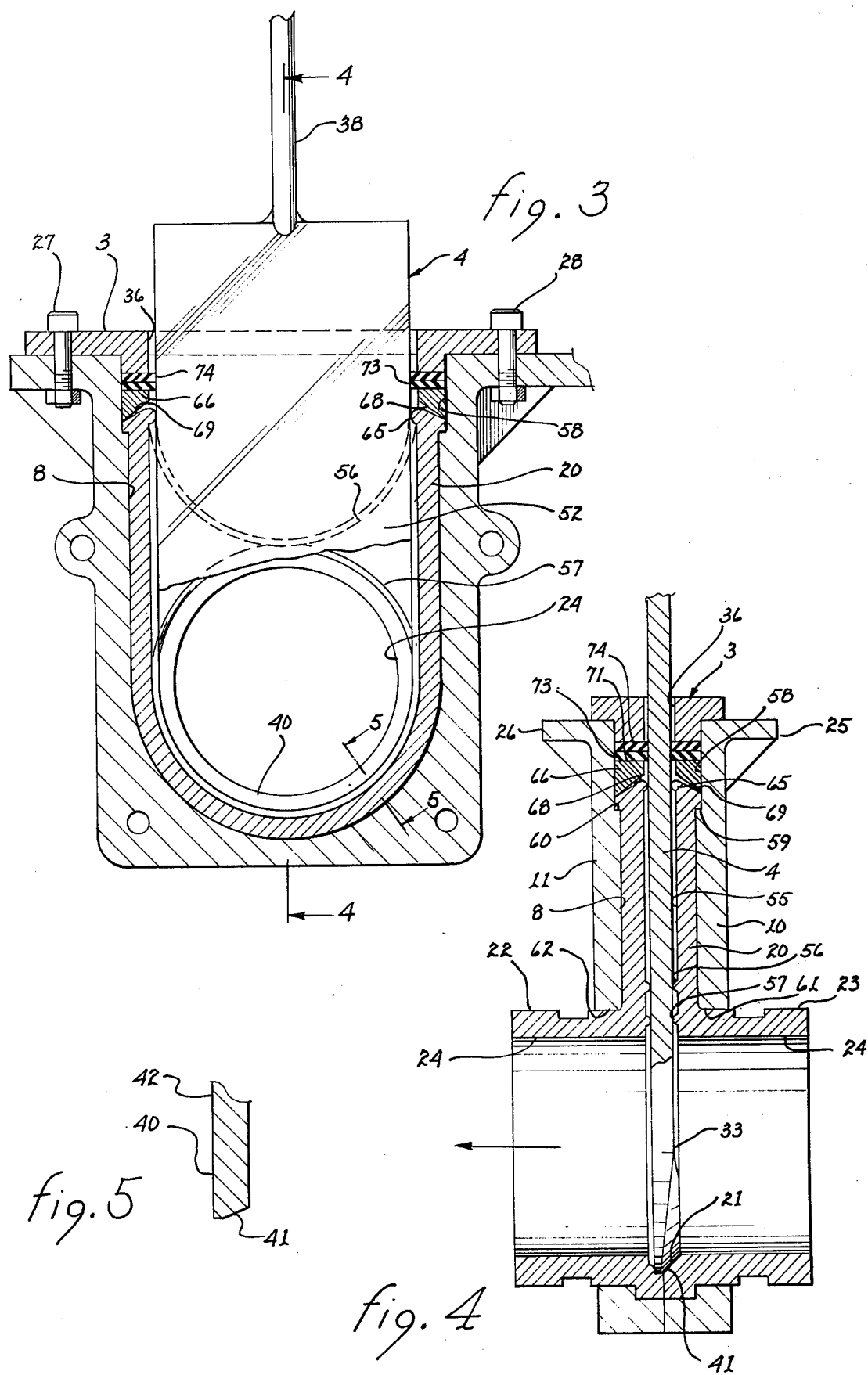

BIASABLE SEAL FOR GATE VALVES

The present invention relates to gate valves and, more particularly, to means for establishing a seal intermediate the gate and the chest of the gate valve.

Historically, gate valves have been constructed with a plurality of elements and necessitating a plurality of gaskets, O-rings and other sealing means for preventing leakage intermediate the elements of the gate valve. In United States patent application entitled "Gate Valve with Replaceable Liner", Ser. No. 614,350, filed Sept. 17, 1975, now U.S. Pat. No. 3,993,092, there is described a gate valve invented by the instant inventor, which gate valve employs a one piece liner for receiving the gate. Utilization of a one piece liner with integrally formed D-ring seals circumvents and otherwise obviates most of the sealing problems attendant prior art gate valves. However, the seals, depending upon their resistance to abrasion and deformation, necessarily have predeterminable life spans of sealing effectiveness with respect to the number of cycles through which the gate valve was operated; thereafter, their sealing capability begings to deteriorate.

It is therefore a primary object of the present invention to prolong the useful life of a gate valve by providing a biasable seal intermediate the gate and the throat within the chest of the gate valve.

Another object of the present invention is to provide a bisable seal formed integral with a one piece liner for a gate valve.

Yet another object of the present invention is to provide a biasable seal for the gate of a gate valve, which seal is sealingly compatible with the surface material of the gate.

Still another object of the present invention is to provide means for biasing a seal for a gate of a gate valve, which biasing means is replaceable without dismantling the whole gate valve.

The prior art gate valves are invariably operated by means of a traveling screw drive mechanism for raising and lowering the gate. Such mechanisms necessarily have slow operating times and the force required to raise or lower the gate is invariably substantially less than that capable of being manually applied by the traveling screw mechanism.

It is therefore a further object of the present invention to provide a lever operated device for rapidly raising and lowering the gate of a gate valve.

A yet further object of the present invention is to provide a lever mechanism for raising and lowering the gate of a gate valve, which lever mechanism is selectively oriented parallel to or normal to the direction of flow through the gate valve.

The above enumerated and other objects of the present invention will become apparent to those skilled in the art as the description thereof proceeds.

The present invention may be described with greater specificity and clarity with reference to the following drawings, in which:

FIG. 3 is a cutaway view illustrating a biasable seal operating upon the gate of a gate valve.

FIG. 4 is a further cutaway view of the biasable seal taken along lines 4—4, as shown in FIG. 3.

FIG. 5 is a partial view of the edge of the gate taken along lines 5—5, as shown in FIG. 3.

Figure 1:
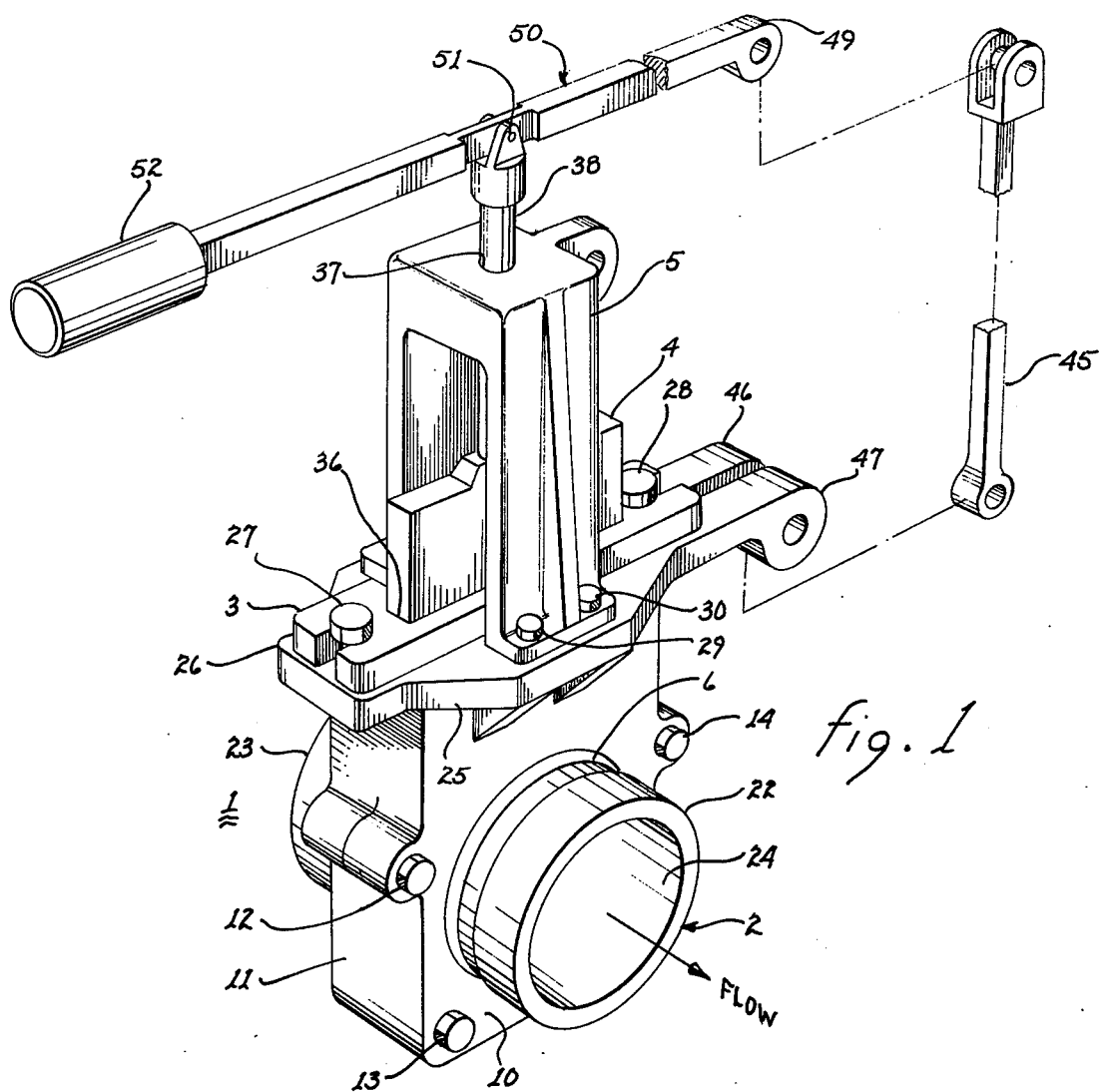
FIG. 1 is an isometric view of a gate valve illustrating a lever actuating mechanism oriented normal to the direction of flow through the gate valve.

FIG. 1 illustrates a gate valve 1 having a pair of essentially mirror image castings 10 and 11 defining the housing of the gate valve. These castings are attached to one another by a plurality of nut and bolt combinations of which bolts 12, 13, 14 are shown and provide the requisite structural strength for the gate valve. A chest 20 of a one piece liner 2 is enclosed within a passageway 8 formed by castings 10 and 11. The liner includes cylindrically shaped outlet conduits 22 and 23 which extend laterally outward of the respective castings through circular apertures 61 and 62 (see FIG. 4) and define a passageway 24. The configuration of these outlets are of the victaulic type (well known to those skilled in the art) for mating with connecting pipes. A packing gland 3 is bolted onto flanges 25 and 26 extending laterally from the upper ends of castings 10 and 11, respectively, by nut and bolt means 27 and 28. A rectangular slot 36 is disposed within the packing gland to accommodate reciprocal motion therethrough by gate 4. A yoke 5 is mounted upon flanges 25 and 26 by nut and bolt means, such as nut and bolt means 29 and 30. An aperture 37 is disposed within the upper end of yoke 5 to receive and guide shaft 38, which shaft extends upwardly from gate 4.

One end of a link 45 is pivotally attached to extending arms 46 and 47 of castings 10 and 11 with the other end of the link being pivotally attached to end 49 of a lever 50. The upper end of shaft 38 is also pivotally attached to lever 50 at pivot point 51. A handle 52 for manual operation of lever 50, or other mechanisms for mechanical actuation of the lever, is disposed at the remaining end of the lever.

From the above description, it may be appreciated that the gate valve is opened through raising of gate 4 by pivoting lever 50 upwardly in a clockwise direction. Similarly, the gate valve is closed by lowering gate 4 through counterclockwise pivotal movement of lever 50. The normally arcuate path of pivot point 51 is translated into vertical rectilinear motion required by shaft 38 through the dual pivoting and repositioning motion of link 45.

Figure 2:
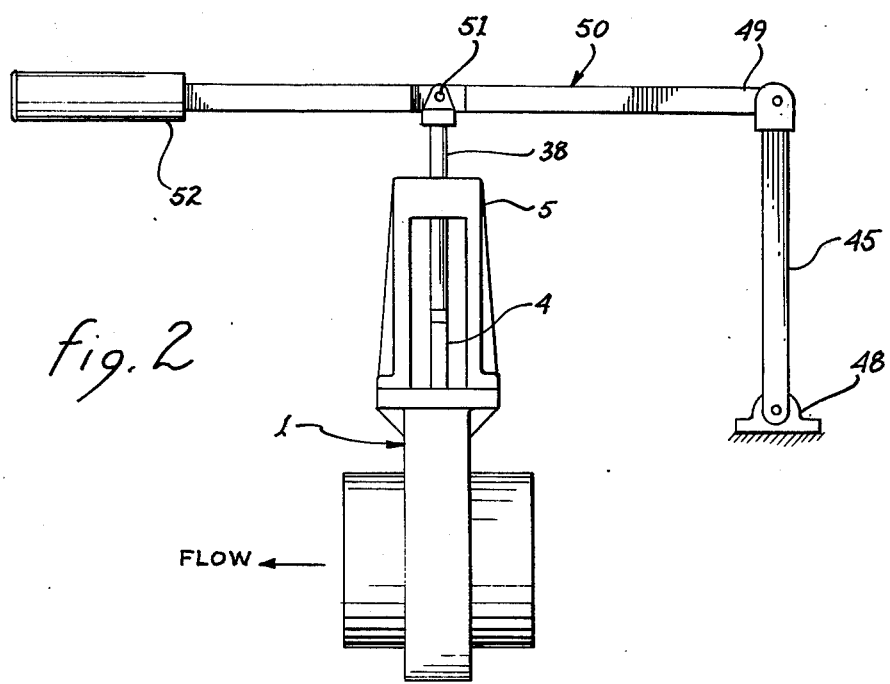
FIG. 2 is a side view of a gate valve illustrating a lever actuating mechanism oriented parallel to the direction of flow through the gate valve.

In FIG. 2, there is illustrated a lever associated mechanism for opening and closing gate valve 1 by pivotal movement of a lever in a vertical plane parallel to the direction of flow of fluid through the gate valve. Herein, link 45 is pivotally attached to a permanently located pillow block 48, or the like, which pillow block is laterally displaced from the gate valve but essentially in vertical alignment with a pipe conveying fluid to or from the gate valve. The operation of the remaining elements numerically identified herein corresponds to that described above with respect to FIG. 1.

Gate 4, as illustrated in FIGS. 1, 3, 4 and 5, is formed of a solid core, which may be cast aluminum, and is encased within a molded plastic material of a composition identical with or similar to the composition of liner 2. Shaft 38 may be formed as an integral part of the solid core during its manufacture or may be subsequently attached to the core by permanent means or by detachable means. Lower end 40 of gate 4 defines a semicircle of a radius commensurate with that of seat 21 within liner 2. Moreover, edge 41 of lower end 40 varies in angle with respect to frontal surface 42 from an angle of approximately 45° at the central lowermost point of the gate to an angle of 90° at the vertical side of the gate. The cross-sectional view of the gate illustrated in FIG. 5 depicts the edge at an angle of approximately 22½° at a point defining an arc of approximately 45° from the lowermost point of the gate. Such construction of the gate, which is described in further detail in the above referenced pending patent application entitled "Gate Valve with Replaceable Liner", ensures that on seating of the gate, it will cleave through any particulate matter lodged within seat 21 and ensure complete closure of the valve.

Considering now FIG. 3 and 4 jointly, the structure and operation of the biasable seal formed as part of one piece liner 2 will be described. Chest 20 extends upwardly from cylindrical outlet conduits 22 and 23 and is molded or otherwise formed as an integral part thereof. Throat 55 within the chest is configured to receive gate 4 and accommodate reciprocal movement of the gate therethrough. A D-ring seal 56, defining an upwardly opening semicircular arc is formed on an integral with surface 52 within throat 55 of liner 2. The upper ends of the defined arc terminate in proximity to the upper extremity of the throat. A similarly configured and positioned D-ring seal 53 is formed on surface 54 of throat 55. These seals serve as preliminary means for restraining a flow of fluid intermediate gate 4 and throat 55. Another D-ring seal, defining a downwardly opening arcuate section is formed on and integral with surface 52 within throat 55. D-ring seal 57 partially circumscribes passageway 24 with the lower ends of the seal terminating in proximity to break 33 on surface 34 of gate 4 when the gate is in the closed position. A further D-ring seal 63 is formed on surface 54 of throat 55. It circumscribes passageway 24 and extends into seat 21. D-ring seals 57 and 63 bear against the respective surfaces of gate 4 and restrain a flow of fluid (as indicated by the arrow in FIG. 4) from conduit 23 to conduit 22 when the gate is in the closed position.

An expanded segment of passageway 8 defines a cavity 58 formed by castings 10 and 11 at the upper ends thereof. A shoulder 59 is disposed at the upper end of chest 20 within cavity 58 to seat upon and receive support from a correspondingly configured seat 60 defined by the cavity. The seat prevents inadvertant downward motion of chest 20 during downward movement of gate 4. Upper movement of the chest during withdrawal of the gate is precluded by the upper surfaces of cylindrical outlet conduits 22 and 23 bearing against the upper surfaces of circular apertures 61 and 62.

A D-ring seal 65 is disposed within throat 55 at the extreme upper end of chest 20 and bears against the adjacent surfaces of gate 4. Top surface 69 at the upper end of the chest slopes downwardly from the circumscribed gate to the walls of cavity 58. A compression ring 66 circumscribes gate 4 and is disposed within cavity 58 to bear against top surface 69. Lower surface 68 of compression ring 66 slopes downwardly toward the walls of the cavity at an angle equal to or greater than the slope of top surface 69. Upper surface 71 of compression ring 66 is essentially perpendicular to the longitudinal axis of chest 20. Packing 73 and 74 is circumscribingly disposed about gate 4 and is positioned adjacent the upper surface of the compression ring. Packing gland 3, mounted upon flanges 25 and 26, bears against packing 73 and 74 and exerts a downward force upon compressing ring 66.

In operation, on securing packing gland 3 in place by tightening nut and bolt means 27 and 28, packing 73 and 74 will become compressed and exert a downward force upon compression ring 66. Lower surface 68 of the compression ring, bearing against top surface 69 of chest 20, will create a resultant force which biases D-ring seal 65 against the respective surfaces of gate 4. It may be appreciated that the sealing force exerted by the D-ring seal is generally proportional to the sine of the angle of the slope. For certain applications, it may be prudent or otherwise more expeditious to form the lower surface of compression ring 66 with a greater slope than the slope of top surface 69 of chest 20.

After a period of substantial use, packing 73 and 74 may become permanently compressed to the extent of no longer exerting a downward force upon compression ring 66. With the consequent lack of biasing force upon top surface 69, sufficient pressure might not be exerted upon D-ring seal 65 to ensure its effective sealing engagement with gate 4. Should this happen, packing gland 3 is easily dismounted to provide access for replacing packing 73 and 74. The replaced packing, held in place with the remounted packing gland, will again exert a force upon compression ring 66 and bias D-ring seal 65 against the gate. Thereby, seal effectiveness can be maintained within the throat of the gate valve without disassembly of the gate; moreover, it may even be possible to replace packing 73 and 74 without even taking the gate valve out of service.

While the principles of the invention have now been made clear in an illustrative embodiment, there will be immediately obvious to those skilled in the art many modifications of structure, arrangement, proportions, elements, materials, components, used in the practice of the invention which are particularly adapted for specific environments and operating requirements without departing from those principles.

I claim:

1. In a gate valve formed by a pair of castings for housing the chest of a one piece liner and including a gate rectilinearly translatable into and out of the throat of the chest, a biasable seal comprising in combination:
    a. a ridge extending into the throat in proximity to the end of the chest for sealingly engaging the gate;
    b. a compression ring for exerting a force upon the end of the chest;
    c. bias means for translating the force exerted by said compression ring into a force urging said ridge into engagement with the gate;
    d. an expanded cavity disposed within the pair of castings for receiving the end of the chest and said compression ring, said cavity including a seat for receiving a shoulder of the chest, said seat and shoulder, in combination, restricting movement of the chest away rom said compression ring;
    e. packing means disposed within said cavity for urging said compression ring toward the end of the chest; and
    f. packing gland means secured to the pair of castings for placing said packing means under pressure;
whereby, said packing gland means establishes a force for maintaining said ridge in sealing engagement with the gate to prevent leakage through the chest.

2. The seal as set forth in claim 1 wherein said ridge comprises a D-ring seal.

3. The seal as set forth in claim 2 wherein said bias means comprises:

a. a top surface of the chest sloping laterally and downwardly from the throat; and b. a bottom surface of said compression ring sloping laterally and downwardly at an angle commensurate with the slope anlge of said top surface.

4. The seal as set forth in claim 3 including lever means for repositioning the gate within the chest to open and close the gate valve.

5. In a gate valve having a one piece liner supported within the gate valve for receiving the gate and including a chest having a throat for guidingly accommodating rectilinear motion of the gate therein, the improvement comprising in combination:

a. a seal disposed at the end of the chest, said seal extending into the throat for contactingly engaging the surface of the gate;

b. a compression ring mounted adjacent the end of the chest in proximity to said seal;

c. bias means for urging said seal into contacting relationship with the surface of the gate in response to pressure exerted by said compression ring;

d. packing means disposed adjacent said compression ring for conveying a force upon said compression means; and e. a packing gland for placing said packing means in compression;

whereby, the force exerted upon said compression upon said compression by said packing gland through said packing means biases said seal into sealing engagement with the gate to prevent leakage through the chest intermediate the gate and the throat.

6. A gate valve including a biasable seal disposed intermediate the gate and the throat of the gate valve chest, said seal comprising in combination:

a. a ridge extending into the throat in proximity to the end of the chest and in general engagement with the surface of the gate for establishing a seal therebetween;

b. a compression ring disposed adjacent the upper surface of the end of the chest for biasing said ridge toward the surface of the gate; and c. packing gland means for urging said compression ring against the chest;

whereby, the force exerted by said packing gland means is translated through said compression ring and the chest to maintain said ridge in sealing engagement with the surface of the gate and prevent leakage through the throat of the chest.

7. The gate valve as set forth in claim 6 including lever means for opening and closing the gate.

8. The gate valve as set forth in claim 7, said lever means comprising:

a. a shaft extending upwardly from the gate;

b. a yoke for guiding said shaft;

c. a link having one end pivotally affixed; and d. a lever for raising and lowering the gate, said lever being pivotally attached to another end of said link and pivotally attached to said shaft;

whereby, said link serves as a pivot point for said lever and accommodates repositioning of said lever to afford rectilinear motion of said shaft necessitated by said yoke.

9. The gate valve as set forth in claim 8 wherein said one end of said link is pivotally affixed to the gate valve to provide pivotal movement of said lever in a vertical plane normal to the direction of flow of fluid through the gate valve.

10. The gate valve as set forth in claim 8 wherein said one end of said link is pivotally affixed within a vertical plane generally coincident with the direction of flow of fluid through the gate valve and provides pivotal movement of said lever in a vertical plane parallel to the direction of flow of fluid through the gate valve.

11. The seal as set forth in claim 6 wherein said ridge comprises a D-ring seal.

12. The seal as set forth in claim 11 wherein said packing gland means comprises packing positioned adjacent said compression ring and a packing gland attached to the gate valve for placing said packing gland in compression.

* * * * *